United States Patent
Endo et al.

(10) Patent No.: US 9,508,147 B2
(45) Date of Patent: Nov. 29, 2016

(54) INFORMATION PROCESSING APPARATUS AND METHOD

(71) Applicant: CANON KABUSHIKI KAISHA, Tokyo (JP)

(72) Inventors: Takaaki Endo, Urayasu (JP); Shiji Uchiyama, Yokohama (JP); Takashi Aso, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/674,680

(22) Filed: Nov. 12, 2012

(65) Prior Publication Data

US 2013/0064454 A1 Mar. 14, 2013

Related U.S. Application Data

(63) Continuation of application No. 11/482,400, filed on Jul. 7, 2006, now Pat. No. 8,330,800.

(30) Foreign Application Priority Data

Jul. 11, 2005 (JP) .................................. 2005-201605

(51) Int. Cl.
  *H04N 15/00* (2006.01)
  *G06T 7/00* (2006.01)
  *G06T 19/00* (2011.01)

(52) U.S. Cl.
  CPC ........... *G06T 7/0018* (2013.01); *G06T 19/006* (2013.01)

(58) Field of Classification Search
  CPC .. H04J 11/0076; H04J 11/0079; H04J 27/26; H04J 27/2657; H04J 27/2666; H04J 27/2675
  USPC .............................................. 348/46, 47, 49
  IPC ..................................................... H04N 15/00
  See application file for complete search history.

(56) References Cited

U.S. PATENT DOCUMENTS

| | | | | |
|---|---|---|---|---|
| 5,657,079 A | * | 8/1997 | Thario et al. | 348/190 |
| 6,064,749 A | * | 5/2000 | Hirota | G06F 3/011 |
| | | | | 345/7 |
| 6,246,900 B1 | * | 6/2001 | Cosman et al. | 600/426 |

(Continued)

FOREIGN PATENT DOCUMENTS

| JP | 2000350860 A | 12/2000 |
|---|---|---|
| JP | 2005157611 A | 6/2005 |

OTHER PUBLICATIONS

U.S. Appl. No. 13/674,680, Tung Vo.*

(Continued)

*Primary Examiner* — Tung Vo
(74) *Attorney, Agent, or Firm* — Canon U.S.A., Inc. IP Division

(57) ABSTRACT

An index detecting section detects an index in a physical space, from a captured image obtained by an imaging apparatus. An erroneous-detection prevention processing section performs erroneous-detection prevention processing, based on information relating to image coordinates of a detected index. An image output section outputs, to a display device, an image having been subjected to the erroneous-detection prevention processing. This prevents an image displayed on the display device from being mistaken for a real index when the display device is in the field of view of the imaging apparatus.

12 Claims, 10 Drawing Sheets

(56) References Cited

U.S. PATENT DOCUMENTS

| | | | |
|---|---|---|---|
| 6,310,650 B1* | 10/2001 | Johnson et al. ............... 348/383 |
| 6,525,772 B2* | 2/2003 | Johnson et al. ............... 348/383 |
| 6,657,613 B2* | 12/2003 | Yoneno et al. ................ 345/156 |
| 6,657,637 B1* | 12/2003 | Inagaki .................. G06T 15/00 345/418 |
| 6,982,744 B2* | 1/2006 | Jenkins ......................... 348/189 |
| 7,130,754 B2* | 10/2006 | Satoh .................... G06T 7/0018 702/150 |
| 7,312,795 B2* | 12/2007 | Aso ....................... G06T 7/0042 345/419 |
| 7,379,564 B2* | 5/2008 | Kakinami et al. ............. 382/104 |
| 7,671,875 B2* | 3/2010 | Anabuki ............... G06F 3/0325 345/632 |
| 7,995,098 B2* | 8/2011 | Pedeville et al. .............. 348/190 |
| 8,345,952 B2* | 1/2013 | Tsujimoto ............. G06T 19/006 382/103 |
| 8,830,304 B2* | 9/2014 | Miyatani ........... H04N 13/0239 348/115 |
| 8,842,217 B2* | 9/2014 | Sonoda .................. G03B 7/095 348/345 |
| 2002/0084974 A1* | 7/2002 | Ohshima ................. A63F 13/00 345/156 |
| 2002/0103617 A1* | 8/2002 | Uchiyama ............ G06T 7/0044 702/150 |
| 2003/0144813 A1* | 7/2003 | Takemoto ............. G06T 7/0018 702/153 |
| 2003/0182072 A1* | 9/2003 | Satoh .................... G06T 7/0018 702/95 |
| 2003/0227470 A1* | 12/2003 | Genc ....................... G06F 3/011 345/633 |
| 2004/0001074 A1* | 1/2004 | Oyaizu ................... G06T 15/10 345/633 |
| 2005/0159916 A1* | 7/2005 | Anabuki ................ G06T 15/20 702/151 |
| 2005/0163343 A1* | 7/2005 | Kakinami et al. ............ 382/103 |
| 2006/0071946 A1* | 4/2006 | Anabuki ............... G06F 3/0325 345/633 |
| 2009/0021580 A1* | 1/2009 | Ishigami et al. ............... 348/142 |
| 2010/0142826 A1* | 6/2010 | Kotake ................. G06T 7/0046 382/203 |

OTHER PUBLICATIONS

Azuma, "A Survey of Augmented Reality", Presence: Teleoperators and Virtual Environments, Aug. 1997, 355-385, vol. 6, No. 4.

* cited by examiner

FIG.10
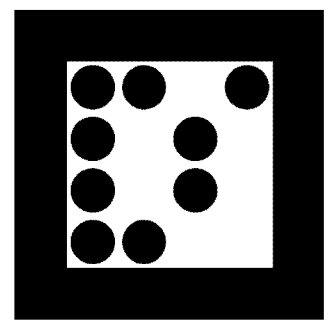
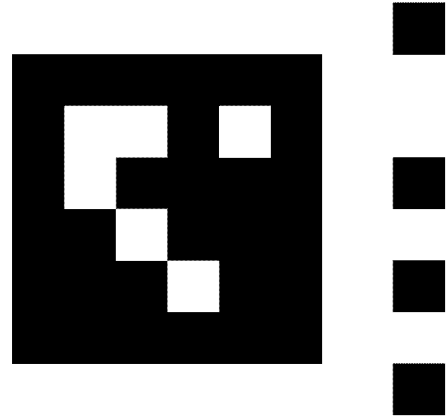

INFORMATION PROCESSING APPARATUS AND METHOD

CROSS-REFERENCE TO RELATED APPLICATIONS

This application is a Continuation of co-pending U.S. patent application Ser. No.: 11/482,400 filed Jul. 7, 2006, which claims the benefit of Japanese Patent Application No. 2005-201605 filed Jul. 11, 2005. The disclosures of the above-named applications are hereby incorporated by reference herein in their entirety.

BACKGROUND OF THE INVENTION

Field of the Invention

The present invention relates to an information processing technique for enabling an information processing system to eliminate erroneous detection of an index contained in an image captured by an imaging apparatus.

Description of the Related Art

Conventional Technique 1

The position and orientation measurement of a camera or another image capturing unit (hereinafter, collectively referred to as a "camera") capturing a physical space is required, for example, in a mixed reality system that can combine a physical space with a virtual space and display a mixed image.

As discussed in Japanese Patent Application Laid-Open No. 11-084307, Japanese Patent Application Laid-Open No. 2000-041173, or A. State, G. Hirota, D. T. Chen, B. Garrett, and M. Livingston: "Superior augmented reality registration by integrating landmark tracking and magnetic tracking," Proc. SIGGRAPH '96, pp. 429-438, July 1996, there is a conventional method for correcting measurement errors of a sensor that can measure the position and orientation of a camera by using markers or feature points (hereinafter, collectively referred to as an "index") having known positions and disposed in the physical space.

These methods are characterized in that the position and orientation of a camera can be estimated based on sensing data of a position and orientation sensor equipped to the camera and information relating to indices captured by the camera. The indices used in these methods are, for example, color regions defining a centroid or concentric circles. In general, a predetermined number of indices are provided in a physical space so that two or more indices can be simultaneously captured by the camera.

When the camera captures an image including indices, each index involved in the captured image must be identified as one of the indices disposed in the physical space. As a method for identifying each index, it is possible to use a relationship between the coordinates of each index detected from the image and the image coordinates of the index obtainable by projecting on the image a known position of the index in the physical space, based on measurement values of a position and orientation sensor.

Conventional Technique 2

As discussed in Kato, Billinghurst, Asano, and Tachibana: "An Augmented Reality System and its Calibration based on Marker Tracking," Transactions of the Virtual Reality Society of Japan, vol. 4, no. 4, pp. 607-616, December 1999, or X. Zhang, S. Fronz, and N. Navab: "Visual marker detection and decoding in AR systems": A comparative study, Proc. of International Symposium on Mixed and Augmented Reality (ISMAR '02), 2002, there is a conventional method for estimating the position and orientation of a camera based on only the indices captured by the camera without relying on the information obtained from a position and orientation sensor.

For example, the position and orientation of a camera can be estimated based on coordinates of four vertices of a square if such a square index is used. However, the square is rotationally symmetric (in each rotation of 90°) about a rotation axis passing through the center (i.e., a crossing point of diagonal lines) and perpendicular to the square surface. Thus, it is impossible to identify the up-and-down or right-and-left direction based on the coordinates of respective vertices.

To solve this problem, a square index can involve an image feature defining the directions. Furthermore, when plural indices are employed, it is necessary to identify each index based on only an image captured by a camera. Thus, an index can involve graphic information, such as a unique pattern or symbol, differentiated for each index.

Conventional Technique 3

The image display apparatus configured to present a mixed reality as described in the conventional technique 1 can be realized by a video see-through head mounted display. The video see-through head mounted display (i.e., a display unit mountable on the head of a user) can display a mixed image including an image of a virtual space (e.g., a virtual object created by computer graphics or text information) superimposed on an image of a physical space captured by a camera, based on the position and orientation of an imaging apparatus.

In this case, for the purpose of letting other observers see the same scene, a display device can be positioned in a physical space to display an image of the physical space captured by the camera, or a mixed image including the virtual space image superimposed on the image of the physical space, which is currently observed by a user of the head mounted display.

In the method for estimating the position and orientation of a camera according to the conventional technique 1, each index can be a small circular sheet having a specific color. In this case, the information of each index is 3-dimensional position information (i.e., coordinates) and the color.

The method for identifying an index can include the steps of projecting a 3-dimensional position of the index onto an image surface of a camera by utilizing measured values of a position and orientation sensor, detecting the color of the index from the image, and calculating a centroid position from the image. Furthermore, the method can include the steps of comparing the image coordinates of a projected index with the centroid position calculated from the image, and identifying a closest one as a true index.

According to the method utilizing a square marker or another graphic index as described in the conventional technique 2, discrimination of each marker is completely dependent on limited information obtainable from an image. Thus, each index must involve distinctive symbol information or template information.

FIG. 10 shows examples of a practical square marker used in the above-described conventional technique 2, which are discussed in Kato, Billinghurst, Asano, and Tachibana: "An Augmented Reality System and its Calibration based on Marker Tracking," Transactions of the Virtual Reality Society of Japan, vol. 4, no. 4, pp. 607-616, December 1999, or X. Zhang, S. Fronz, and N. Navab: "Visual marker detection and decoding in AR systems": A comparative study, Proc. of International Symposium on Mixed and Augmented Reality (ISMAR '02), 2002.

In any conventional technique, if an object similar to an index in color or shape is present in a physical space, the system may erroneously detect this object as a true index if included in an image captured by a camera.

For example, in the above-described conventional technique 3, the display device can display an image of a physical space captured by a camera (or a mixed image including a virtual space image superimposed on the image of the physical space). In this case, if the display device is disposed in the physical space, the camera will capture a display screen of the display device. As a result, an image of an index displayed on the display screen will be erroneously detected as a true index disposed in the physical space.

SUMMARY OF THE INVENTION

An aspect of the present invention is to overcome the above-described drawbacks.

At least one exemplary embodiment is directed to an information processing apparatus including: an image input unit adapted to input an image of a physical space captured by an image capturing unit; a detection unit adapted to detect, from the image, a feature quantity relating to image coordinates of an index in the physical space; a generation unit adapted to generate a display image from the input image; an output unit adapted to cause a display device to display the display image generated by the generation unit; and an erroneous-detection prevention unit adapted to prevent the detection unit from detecting an image of an index displayed by the display device, when the display device is captured by the image capturing unit.

Furthermore, at least one exemplary embodiment is directed to an information processing method including the steps of: inputting a captured image obtained by an imaging apparatus adapted to capture an image of a physical space in which a display device is disposed; detecting, from the captured image, a feature quantity relating to image coordinates of an index in the physical space; generating, from the captured image, a display image to be displayed on the display device; and superimposing a specific image on an image region of the index detected from the captured image.

Moreover, at least one exemplary embodiment is directed to an information processing method including the steps of: inputting a captured image obtained by an imaging apparatus adapted to capture an image of a physical space in which a display device is disposed; setting an image region corresponding to the display device in the captured image; detecting, from an image region of the captured image other than the image region corresponding to the display device, a feature quantity relating to image coordinates of an index in the physical space; and generating, from the captured image, a display image to be displayed on the display device.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 10 is a view illustrating examples of a known conventionally used practical index.

DETAILED DESCRIPTION OF THE EMBODIMENTS

Figure 1:
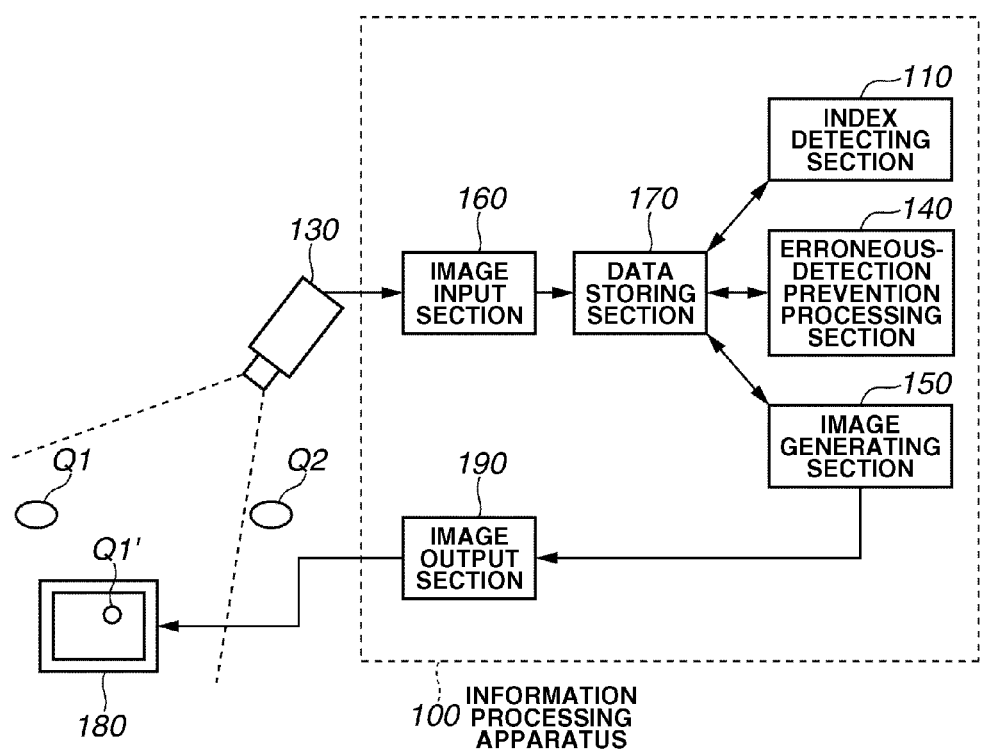
FIG. 1 is a block diagram illustrating a schematic arrangement of an information processing apparatus in accordance with a first exemplary embodiment.

The following description of exemplary embodiments are merely illustrative in nature and is in no way intended to limit the invention, its application, or uses.

Processes, techniques, apparatus, and materials as known by one of ordinary skill in the art may not be discussed in detail but are intended to be part of the enabling description where appropriate. For example, certain circuitry for signal processing, calculating, and others may not be discussed in detail. However these systems and the methods to fabricate these system as known by one of ordinary skill in the relevant art is intended to be part of the enabling disclosure herein where appropriate.

It is noted that throughout the specification, similar reference numerals and letters refer to similar items in the following figures, and thus once an item is defined in one figure, it may not be discussed for following figures.

Exemplary embodiments of the present invention will now be described in detail in accordance with the accompanying drawings.

First Exemplary Embodiment

An information processing apparatus according to a first exemplary embodiment can produce a display image including a 2-dimensional graphics or small image locally superimposed on each index involved in a captured image, to eliminate erroneous detection of indices.

An information processing apparatus and an information processing method according to the first exemplary embodiment have the following features.

FIG. 1 is a block diagram illustrating a schematic arrangement of an information processing apparatus 100 in accordance with the first exemplary embodiment.

The information processing apparatus 100 includes an image input section 160, a data storing section 170, an index detecting section 110, an erroneous-detection prevention processing section 140, an image generating section 150, and an image output section 190. The information processing apparatus 100 is connected to an imaging apparatus 130 and to a display device 180.

A predetermined number of indices (plural indices) $Q_k$ (k=1, ..., $K_Q$) that can be captured by the imaging apparatus 130 are provided at predetermined positions in a physical space. According to an example shown in FIG. 1, two indices $Q_1$ and $Q_2$ are provided in the physical space. One index $Q_1$ is located in a visual field of the imaging apparatus 130.

The indices $Q_k$ can be, for example, circular markers having different colors, or can be natural features or other feature points having different texture features. Furthermore, the indices $Q_k$ can be rectangular indices such as monochrome rectangular regions each having an appropriate size, or can be configured into any other indices if the image coordinates of each index can be detected when it is projected on a captured image and when this index can be identified according to an appropriate method. Furthermore, each index can be intentionally provided. Alternatively, each index can be naturally present in a physical space.

The image input section 160 can receive an image (hereinafter, referred to as a "captured image") produced by the imaging apparatus 130.

Furthermore, the image input section 160 can convert the input captured image into digital data. The data storing section 170 can store the converted digital data.

The index detecting section 110 can input a captured image from the data storing section 170, and detect image coordinates of indices in the input image.

For example, when the indices are markers having different colors, the index detecting section 110 can detect the regions corresponding to respective marker colors from the input image, and can identify centroid positions of detected regions as detected coordinates of the indices.

When the indices are feature points having different texture features, the index detecting section 110 can apply template matching to an input image to detect the positions of the indices. To this end, the index detecting section 110 can store template images of respective indices beforehand as known information.

When the indices are rectangular indices, the index detecting section 110 can apply binarization processing to an input image and can perform labeling to detect each region composed of four straight lines as an index candidate.

Then, to exclude erroneous detection, the index detecting section 110 can determine whether there is any specific pattern in candidate regions, and can obtain an identifier of the index. The rectangular index detected in this manner corresponds to four indices placed on four corners in the present exemplary embodiment.

The index detecting section 110 can output image coordinates of each detected index and an identifier of the detected index to the data storing section 170.

In the following description, $Q_{kn}$ represents an index involved in a captured image when the detected index has an identifier n (n=1, ..., N), where N represents the total number of indices detected on the captured image.

Furthermore, $u^{Q_{kn}}$ represents image coordinates of the detected index $Q_{kn}$. For example, in the example shown in FIG. 1 (i.e., N=1), the index detecting section 110 can output an identifier $k_1$=1 of the detected index and corresponding image coordinates $u^{Q_{k1}}$.

The erroneous-detection prevention processing section 140 can produce a display image including a 2-dimensional graphics or small image locally superimposed on a captured image, at the position corresponding to an index detected by the index detecting section 110.

In other words, when the imaging apparatus 130 captures an image of the display device 180, the erroneous-detection prevention processing section 140 can prevent the index detecting section 110 from erroneously detecting an index (i.e., $Q_1'$ shown in FIG. 1) displayed on the display device 180.

In the present exemplary embodiment, the 2-dimensional graphics or small image is smaller in size than the captured image.

The image generating section 150 can generate a display image to be displayed on the display device 180. The image output section 190 can convert the display image generated by the image generating section 150 into image data and output the converted image data to the display device 180.

The data storing section 170 can store an image input from the image input section 160, image coordinates and identifiers of respective indices input from the index detecting section 110, and camera parameters of the imaging apparatus 130.

The image input section 160, the data storing section 170, the index detecting section 110, the erroneous-detection prevention processing section 140, the image generating section 150, and the image output section 190, shows in FIG. 1, can be separate units, or can be a software program installable in a single or plural computers and executable by a central processing unit (CPU) in the computer to realize the functions.

In the present exemplary embodiment, a single computer executes the software program to realize the functions of the above-described plural sections (i.e., the image input section 160, the data storing section 170, the index detecting section 110, the erroneous-detection prevention processing section 140, the image generating section 150, and the image output section 190).

Figure 2:
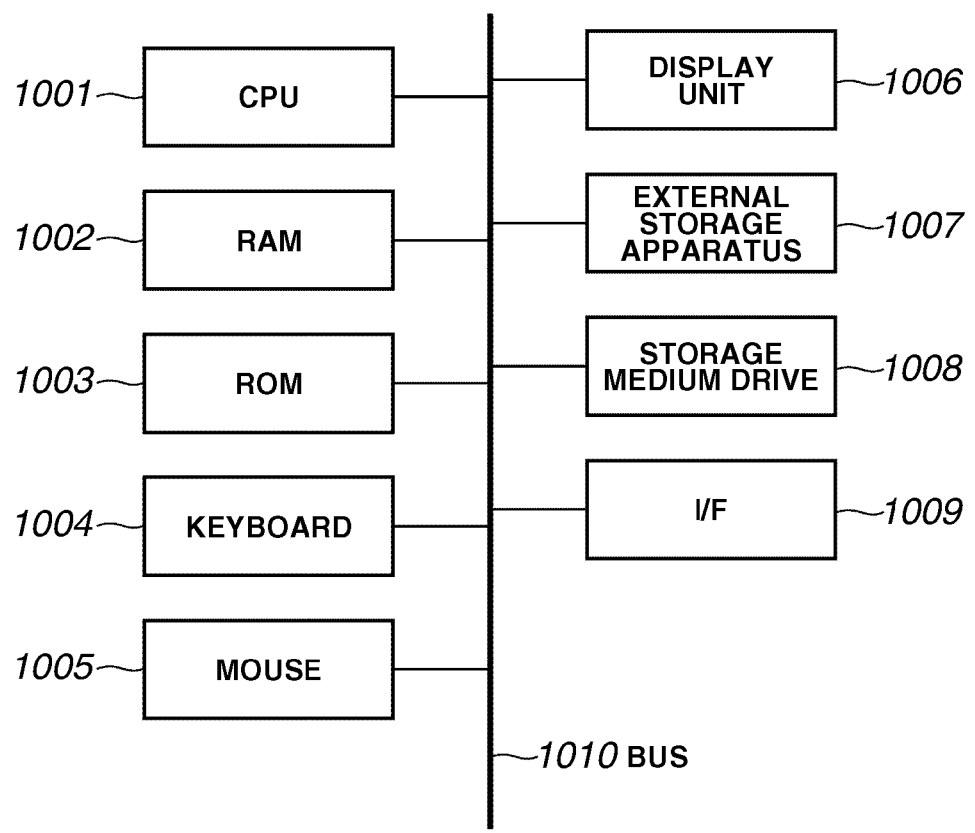
FIG. 2 is a block diagram illustrating a fundamental arrangement of a computer that can execute software programs for realizing functions of the information processing apparatus shown in FIG. 1.

FIG. 2 is a block diagram showing a fundamental arrangement of a computer that can execute a software program to realize the functions of the image input section 160, the data storing section 170, the index detecting section 110, the erroneous-detection prevention processing section 140, the image generating section 150, and the image output section 190.

A CPU 1001 can perform overall control of the computer based on program or data stored in a RAM 1002 or a ROM 1003, and control the execution of software program(s) to realize the functions of the image input section 160, the data storing section 170, the index detecting section 110, the erroneous-detection prevention processing section 140, the image generating section 150, and the image output section 190.

The RAM 1002 has an area temporarily storing a program and data loaded from an external storage apparatus 1007 or from a storage medium drive 1008, and a work area for various processing performed by the CPU 1001. The RAM 1002 can realize the function of the data storing section 170.

The ROM 1003 can store a program and setting data of the computer. A keyboard 1004 and a mouse 1005 allow an operator of the computer to input various instructions to the CPU 1001.

A display unit 1006 can be a cathode-ray tube (CRT) or a liquid crystal screen, which is capable of displaying a message, for example, required in the position and orientation measurement of the imaging apparatus 130.

The external storage apparatus 1007 can function as amass information storage apparatus, such as a hard disk, which is capable of storing an OS (operating system) and software programs. Furthermore, the known information in the present exemplary embodiment can be stored in the external storage apparatus 1007 and can be loaded to the RAM 1002 when required.

The storage medium drive 1008 can read programs and data stored in a CD-ROM, a DVD-ROM, or another storage media in accordance with an instruction supplied from the CPU 1001 and output readout programs and data to the RAM 1002 or to the external storage apparatus 1007.

An interface (I/F) 1009 includes an analog video port or an IEEE 1394 or another digital input/output port, through which the imaging apparatus 130 can be connected to the computer, an RS232C or USB serial port, through which an orientation sensor (not shown) can be connected to the computer, or an Ethernet (registered trademark) port through which the information relating to each identified index can be outputted to an external device. The data input through the interface 1009 can be stored in the RAM 1002. The interface 1009 can realize part of the function of the image input section 160.

The above-described constituent components are mutually connected via a bus 1010.

Figure 3:
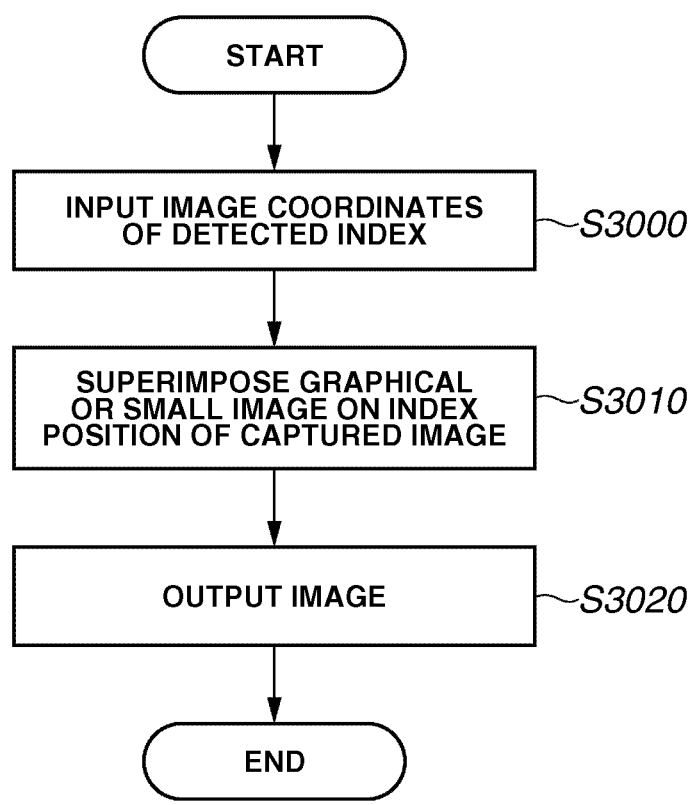
FIG. 3 is a flowchart showing processing for eliminating erroneous detection of indices in accordance with the first exemplary embodiment.

FIG. 3 is a flowchart showing processing for eliminating erroneously detected indices displayed on the display device 180 in accordance with the first exemplary embodiment. The processing is realized when the CPU 1001 executes a software program corresponding to the function of the erroneous-detection prevention processing section 140. In this case, program code for the flowchart of FIG. 3 is already loaded in the RAM 1002 before the CPU 1001 performs the following processing.

Through the processing shown in FIG. 3, the erroneous-detection prevention processing section 140 can produce a display image including a 2-dimensional graphics or small image locally superimposed on an index region, to be displayed on the display device 180.

In step S3000, the erroneous-detection prevention processing section 140 inputs, from the data storing section 170, image coordinates $u^{Qn}$ of each index $Q_n$ detected by the index detecting section 110.

In step S3010, the erroneous-detection prevention processing section 140 produces a display image including a 2-dimensional graphics or small image locally superimposed, at the position corresponding to the image coordinates $u^{Qm}$, on a captured image to which the index detecting section 110 has applied index detection processing.

For example, when the indices are markers having different colors, the erroneous-detection prevention processing section 140 can use, as a 2-dimensional graphics or small image to be superimposed on a marker positioned at the image coordinates $u^{Qm}$, a circle or another graphic pattern having a non-registered marker color that can completely conceal the marker.

Furthermore, when the indices are feature points having different texture features, the erroneous-detection prevention processing section 140 can use, as a 2-dimensional graphics or small image to be superimposed on a feature point, an appropriate size of image that can conceal a part of the texture features.

Furthermore, when the indices are rectangular indices, the erroneous-detection prevention processing section 140 can use, as a 2-dimensional graphics or small image to be superimposed on a rectangular index, a specific image that can camouflage a rectangular shape of the index.

Figure 4:
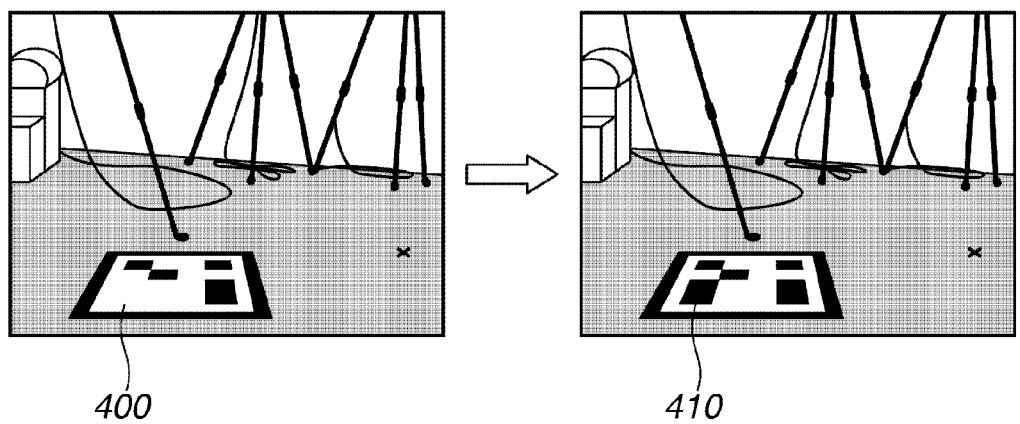
FIG. 4 shows an example of a superimposed graphic image that can conceal a part of a rectangular index in accordance with the first exemplary embodiment.

FIG. 4 shows an example of a rectangular pattern 410 superimposed on a part of a specific pattern in an index region 400 of a rectangular index. According to the example shown in FIG. 4, the superimposed image can conceal the image features provided in the rectangular index, which can be used to identify the direction of the index.

In step S3020, the erroneous-detection prevention processing section 140 outputs, to the data storing section 170, a display image including the 2-dimensional graphics or small image locally superimposed on the captured image. The display device 180 displays the image including the locally superimposed 2-dimensional graphics or small image.

Through the above processing, the image including the locally superimposed 2-dimensional graphics or small image is displayed on the display device 180. Therefore, even when a display image (i.e., a display screen of the display device 180) is captured by the imaging apparatus 130, the present exemplary embodiment can prevent the index detecting section 110 from erroneously detecting an index included in the display image as a true index.

As described above, the information processing apparatus and the information processing method according to present exemplary embodiment can prevent an index displayed on the display device in a physical space from being erroneously detected as a real index, when the display device is captured by an imaging apparatus, because a 2-dimensional graphics or small image is superimposed on the region corresponding to the index displayed on the displace device.

In the above-described exemplary embodiment, the image to be superimposed on the index displayed on the display device is not limited to a 2-dimensional graphics or small image and can be a virtual object image or any other image.

Second Exemplary Embodiment

An information processing apparatus according to a second exemplary embodiment is differentiated from the information processing apparatus according to the first exemplary embodiment, in that a position and orientation calculating section is additionally provided. The position and orientation calculating section can calculate the position and orientation of the imaging apparatus 130 based on the information relating to respective indices detected by the index detecting section 110.

Figure 5:
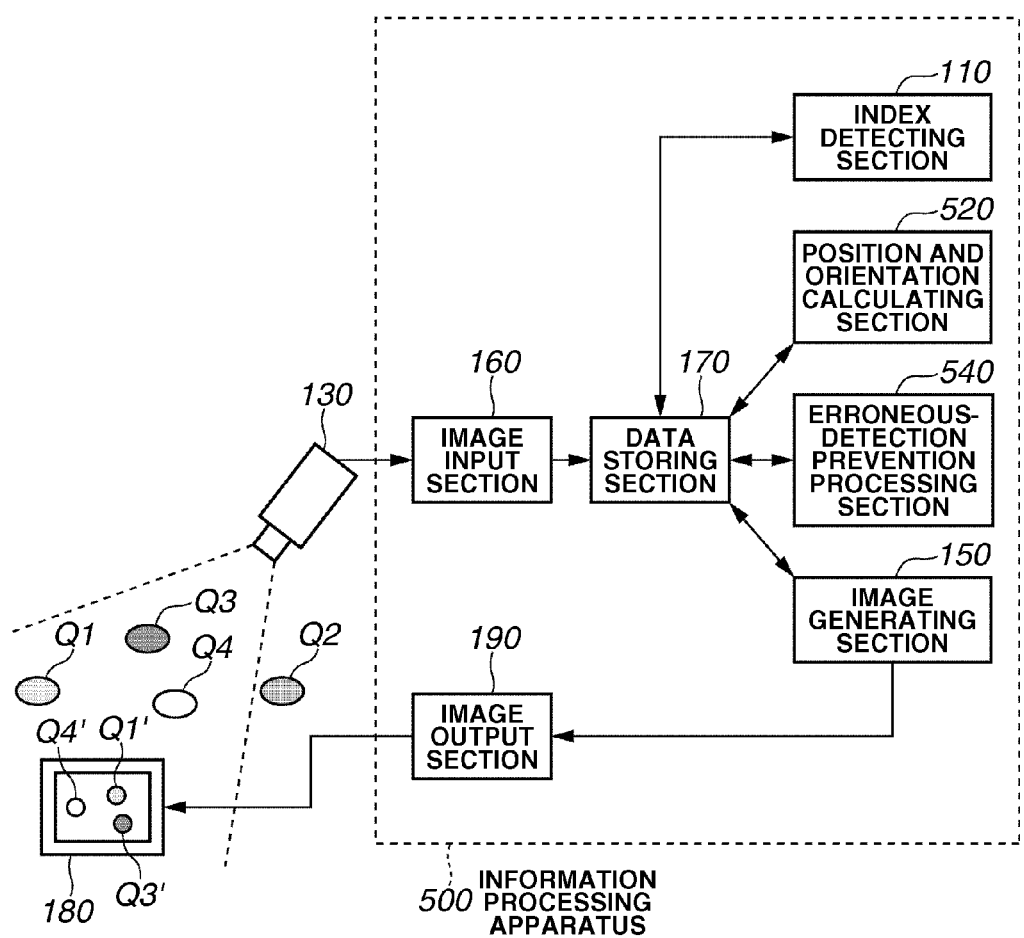
FIG. 5 is a block diagram illustrating a schematic arrangement of an information processing apparatus in accordance with a second exemplary embodiment.

FIG. 5 is a block diagram illustrating a schematic arrangement of the information processing apparatus in accordance with the second exemplary embodiment. The portions identical with those already described in FIG. 1 are denoted by the same reference numbers or characters and will not be described in detail.

An information processing apparatus 500 includes the image input section 160, the data storing section 170, the index detecting section 110, a position and orientation calculating section 520, an erroneous-detection prevention processing section 540, the image generating section 150, and the image output section 190. The information processing apparatus 500 is connected to the imaging apparatus 130 and to the display device 180.

A predetermined number of indices, which can be captured by the imaging apparatus 130, are provided at predetermined positions in a physical space. More specifically, plural indices $Q_k$ (k=1, ..., $K_Q$) are disposed at predetermined positions $x_W^{Qk}$ defined in a world coordinate system (i.e., a coordinate system having an origin defined in a physical space and X-, Y-, and Z-axes perpendicular to each other and extending from the origin).

In the present exemplary embodiment, it is preferable that at least three indices $Q_k$ are constantly involved in an image captured by the imaging apparatus 130. According to the example shown in FIG. 5, a total of four indices $Q_1$, $Q_2$, $Q_3$, and $Q_4$ are provided and three indices $Q_1$, $Q_3$, and $Q_4$ are positioned in the visual field of the imaging apparatus 130.

In this case, N (total number of detected indices involved in a captured image)=3, the index detecting section 110 outputs identifiers $k_1=1$, $k_2=3$, and $k_3=4$ of captured indices and corresponding image coordinates $u^{Qk1}$, $u^{Qk2}$, and $u^{Qk3}$.

The position and orientation calculating section 520 can input, from the data storing section 170, a combined data set of the image coordinates $U^{Qkn}$ of each inside-out camera index detected by the index detecting section 110 and world coordinates $x_W^{Qkn}$ corresponding to the detected inside-out camera index stored beforehand as known information.

The position and orientation estimating section 520 can calculate the position and orientation of the imaging apparatus 130 based on the combined information. For example, the calculated position and orientation can be expressed in terms of a combination of a 3-dimensional vector $x_W^C$ representing the position and a 3×3 matrix $R_{WC}$ representing the orientation, and can be output to the data storing section 170.

A method for calculating the position and orientation of the imaging apparatus based on the combination of the world coordinates and the image coordinates of the inside-out camera indices is known in the field of photogrammetry or the like (for example, refer to R. M. Haralick, C. Lee, K. Ottenberg, and M. Nolle: "Review and analysis of solutions of the three point perspective pose estimation problem," International Journal of Computer Vision, vol. 13, no. 3, pp. 331-356, 1994, or D. G. Lowe: Fitting parameterized three-dimensional models to images, IEEE Transactions on PAMI, vol. 13, no. 5, pp. 441-450, 1991).

When the imaging apparatus 130 captures an image of the display device 180, the erroneous-detection prevention processing section 540 can produce a display image including a 3-dimensional virtual object superimposed on an estimate position of each index to prevent the index detecting section 110 from erroneously detecting the images of indices displayed on the display device 180 (i.e., $Q_1$', $Q_3$', and $Q_4$' shown in FIG. 5). The superimposed image used in the present exemplary embodiment is not limited to a 3-dimensional virtual object and can be any other 2-dimensional graphics or small image.

The image input section 160, the data storing section 170, the index detecting section 110, the position and orientation calculating section 520, the erroneous-detection prevention processing section 540, the image generating section 150, and the image output section 190 shown in FIG. 5 can be configured as independent devices or can be configured as software programs installable in one or plural computers so that the CPU of each computer can execute the programs to realize the functions of respective sections.

In the present exemplary embodiment, a single computer having the fundamental arrangement shown in FIG. 2 executes the software programs to realize the functions of the above-described plural sections (i.e., the image input section 160, the data storing section 170, the index detecting section 110, the position and orientation calculating section 520, the erroneous-detection prevention processing section 540, the image generating section 150, and the image output section 190).

Figure 6:
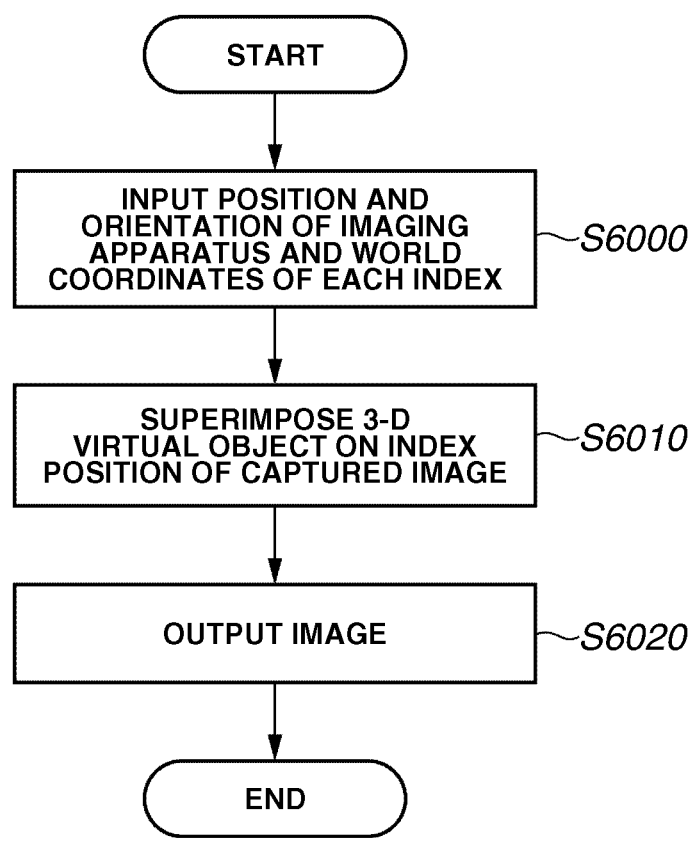
FIG. 6 is a flowchart showing processing for eliminating erroneous detection of indices in accordance with the second exemplary embodiment.

FIG. 6 is a flowchart showing processing for eliminating erroneous detection of indices in accordance with the second exemplary embodiment. The processing is realized when the CPU 1001 executes a software program corresponding to the function of the erroneous-detection prevention processing section 540. In this case, program code for the flowchart of FIG. 6 is already loaded in the RAM 1002 before the CPU 1001 performs the following processing.

In step S6000, the erroneous-detection prevention processing section 540 inputs, from the data storing section 170, the position and orientation of the imaging apparatus 130 calculated by the position and orientation calculating section 520 and world coordinates $X_W^{Qkn}$ of each index stored beforehand as known information.

In step S6010, the erroneous-detection prevention processing section 540 applies perspective projection conversion to the world coordinates $x_W^{Qkn}$ of the index based on the position and orientation of the imaging apparatus 130, and produces a display image including a 3-dimensional virtual object superimposed on a converted position.

In step S6020, the erroneous-detection prevention processing section 540 outputs, to the data storing section 170, the display image including the 3-dimensional virtual object superimposed on the captured image.

The image output section 190 outputs, to the display device 180, the display image including the 3-dimensional virtual object superimposed on a captured image obtained through the above-described processing. Thus, even when the display device 180 is captured by the imaging apparatus 130, the present exemplary embodiment can prevent the image of an index displayed on the display device 180 from being erroneously detected as a real index.

In the present exemplary embodiment, the imaging apparatus can install a position and orientation sensor that can measure the position and orientation of the imaging apparatus. In this case, compared to the detection based on information obtainable from an image, the position and orientation of the imaging apparatus can be stably estimated.

In the present exemplary embodiment, the imaging apparatus can incorporate an inertia sensor to calculate the position and orientation of the imaging apparatus, for example, according to the method proposed by Hirofumi FUJII, Masayuki KANBARA, Hidehiko IWASA, Haruo TAKEMURA, and Naokazu YOKOYA: "A Registration Method Using Stereo Cameras with an Inertial Sensor for Augmented Reality," The Institute of Electronics, Information and Communication Engineers, Technical Report PRMU99-192 (Singaku Gihou, vol. 99, no. 574, pp. 1-8).

In this case, on a captured image obtained by an imaging apparatus, at least two indices must be constantly observed. In this case, compared to the method using only the image information, the position and orientation of the imaging apparatus can be stably estimated.

As described above, the information processing apparatus and the information processing method according to the second exemplary embodiment can produce a display image including a 3-dimensional virtual object superimposed on a candidate region where an index is probably present, even when detection of an index is failed.

For example, an index may not be detected from a captured image due to darkness of the scene. In such a case, the present exemplary embodiment can prevent the index displayed brightly on the display device in a physical space from being erroneously detected as a real index.

Third Exemplary Embodiment

According to the above-described first and second exemplary embodiments, the index detecting section applies the index detection processing to the entire region of a captured image. However, it is possible to preliminarily exclude a region corresponding to the display device from a target region to which the index detection processing is applied. Such settings can eliminate erroneous detection of an index displayed on the display device, because no index detection processing is applied to the region corresponding to the display device.

An information processing apparatus according to a third exemplary embodiment is structurally similar to the information processing apparatus of the second exemplary embodiment (refer to FIG. 5), but is differentiated in functions of the erroneous-detection prevention processing section 540 and the index detecting section 110.

When the imaging apparatus 130 captures an image of the display device 180, the erroneous-detection prevention processing section 540 can calculate a specific region of a captured image, which probably includes the image of display device 180, based on the position and orientation of the imaging apparatus 130 and the position and orientation of the display device 180. The erroneous-detection prevention processing section 540 can output the information relating to the calculated region to the data storing section 170.

The index detecting section 110 can input, from the data storing section 170, the information relating to the specific region of the captured image which probably includes the image of display device 180, and can apply the index detection processing to the captured image excluding the specific region corresponding to the display device 180.

Figure 7:
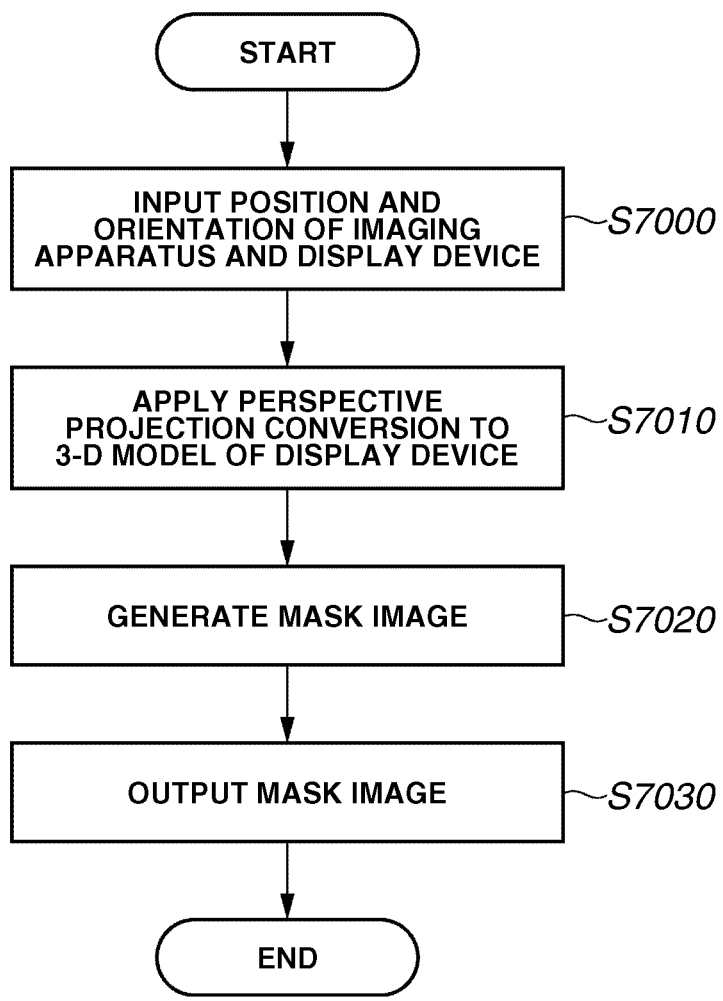
FIG. 7 is a flowchart showing processing for eliminating erroneous detection of indices in accordance with a third exemplary embodiment.

FIG. 7 is a flowchart showing the processing for calculating the specific region of a captured image which probably includes the image of the display device 180. The processing is realized when the CPU 1001 executes a software program corresponding to the function of the erroneous-detection prevention processing section 540. In this case, program code for the flowchart of FIG. 7 is already loaded in the RAM 1002 before the CPU 1001 performs the following processing.

In step S7000, the erroneous-detection prevention processing section 540 inputs, from the data storing section 170, the position and orientation of the imaging apparatus 130 calculated by the position and orientation calculating section 520, the position and orientation of the display device stored beforehand as known information, and a (schematic) 3-dimensional model.

In the initial condition, the index detecting section 110 has not yet detected any index. The position and orientation calculating section 520 cannot calculate the position and orientation of the imaging apparatus 130. Therefore, in the initial condition, the erroneous-detection prevention processing section 540 inputs, from the data storing section 170, an initial position and an initial orientation of the imaging apparatus 130 which are stored beforehand as known information.

In step S7010, the erroneous-detection prevention processing section 540 applies perspective projection conversion to the (schematic) 3-dimensional model of the display device 180 and obtains a converted position on a captured image based on the position and orientation of the imaging apparatus 130 and the position and orientation of the display device 180.

In step S7020, the erroneous-detection prevention processing section 540 calculates a specific region of the image occupied by the 3-dimensional model of the display device 180. Then, the erroneous-detection prevention processing section 540 generates a mask image which is formed, for example, by allocating a pixel value "1" to the calculated region occupied by the 3-dimensional model of the display device 180 and allocating a pixel value "0" to the rest of the image.

In step S7030, the erroneous-detection prevention processing section 540 outputs the mask image produced in step S7020 to the data storing section 170.

The index detecting section 110 obtains the mask image, and applies the index detection processing to the region having the pixel value "0" in the mask image. Through the above processing, the index detecting section 110 can eliminate erroneous detection of the index displayed on the display device.

In the third exemplary embodiment, the imaging apparatus can install a position and orientation sensor to measure the position and orientation of the imaging apparatus. In this case, the data storing section 170 needs not store the initial position and the initial orientation of the imaging apparatus 130.

Furthermore, when the display device is a mobile type in the third exemplary embodiment, it is possible to calculate the position and orientation of the display device using a method similar to the processing for calculating the position and orientation of the imaging apparatus described in the above-described second exemplary embodiment, instead of inputting, from the data storing section 170, the position and orientation of the display device stored beforehand as known information.

As described above, the information processing apparatus and the information processing method according to the third exemplary embodiment does not apply the index detection processing to the image of an index displayed on the display device, even when the imaging apparatus captures an image of the display device positioned in a physical space. Thus, the third exemplary embodiment can eliminate erroneous detection of indices.

Fourth Exemplary Embodiment

According to the above-described first and second exemplary embodiments, the erroneous-detection prevention processing section eliminates erroneous detection of indices by superimposing a graphical or other pattern on the index position of a captured image.

The fourth exemplary embodiment provides an information processing apparatus and an information processing method that can prevent the imaging apparatus from capturing a display screen of the display device.

Figure 8:
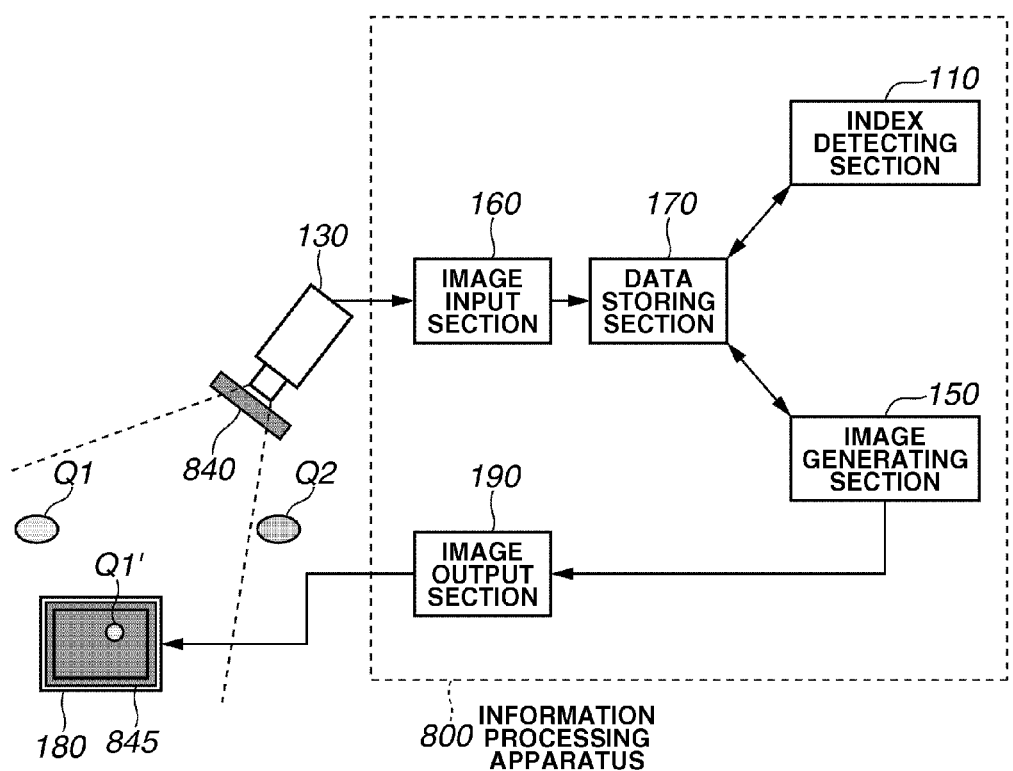
FIG. 8 is a block diagram illustrating a schematic arrangement of an information processing apparatus in accordance with a fourth exemplary embodiment.

FIG. 8 is a block diagram illustrating a schematic arrangement of an information processing apparatus in accordance with the fourth exemplary embodiment. The portions similar to those already described in FIG. 1 are denoted by the same reference numbers or characters and will not be described in detail.

An information processing apparatus 800 according to the fourth exemplary embodiment includes the image input section 160, the data storing section 170, the index detecting section 110, the image generating section 150, and the image output section 190. The information processing apparatus 800 is connected to the imaging apparatus 130 and to the display device 180.

In the fourth exemplary embodiment, a polarizing filter 840 is attached to the imaging apparatus 130 and a polarizing filter 845 is attached to the display device 180. The polarizing filter 840 and the polarizing filter 845 can function as an erroneous-detection prevention unit.

For example, circular polarizing filters mutually differentiated in rotational direction are disposed on the imaging apparatus 130 and the display device 180. For example, a clockwise circular polarizing filter 840 is attached to the imaging apparatus 130, and a counterclockwise circular polarizing filter 845 is attached to the display device 180.

According to the arrangement of the present exemplary embodiment, the imaging apparatus 130 can constantly capture a dark display screen of the display device 180 regardless of the positional relationship between the imaging apparatus 130 and the display device 180. More specifically, the captured image includes a black display screen of the display device 180. Therefore, the index detecting section 110 cannot detect any index displayed on the display screen.

Instead of using the polarizing filters 840 and 845, the present exemplary embodiment can adjust a refresh rate of the display device 180 and a frame rate of the imaging apparatus 130 to be mutually different values. Such settings can prevent the imaging apparatus 130 from normally capturing a display screen (refer to the left part of FIG. 9) of the display device 180.

Figure 9:
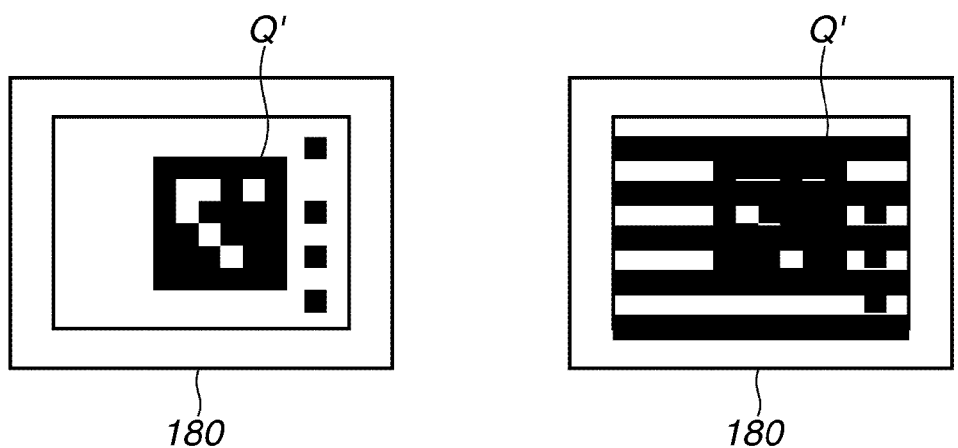
FIG. 9 is a view showing one example of a display image of an index obtainable when a refresh rate of a display device or a frame rate of an imaging apparatus is controlled.

For example, if the imaging apparatus 130 has a frame rate of 100 fps (i.e., shutter speed of 0.01 sec) and the display device 180 has a refresh rate of 60 Hz, a black stripe pattern will appear on an image of the display screen of the display device 180 captured by the imaging apparatus 130, as shown at the right part of FIG. 9.

Therefore, at least a part of the index Q' can be concealed by the black stripe pattern. Thus, when the index Q' is a feature point having texture features or a rectangular index as shown in FIG. 10, the present exemplary embodiment can prevent an index displayed on the display screen from being erroneously detected as a real index in the scene. In this case, the arrangement of the information processing apparatus preferably does not include the polarizing filters 840 and 845 shown in FIG. 8.

As described above, according to the information processing apparatus and the information processing method according to the fourth exemplary embodiment, the imaging apparatus cannot normally capture the display screen of the display device positioned in a physical space. Thus, the fourth exemplary embodiment can eliminate erroneous detection of indices.

Other Exemplary Embodiments

According to the above-described first and second exemplary embodiments, the erroneous-detection prevention processing section superimposes a specific image on a 3-dimensional position of the index so as to modify or conceal the index. However, it is possible to completely conceal the entire display device by superimposing another image on an image region including the display device in a captured image.

Furthermore, it is possible to dispose a 3-dimensional virtual object corresponding to the shape of a screen of the display device so as to conceal only the screen of the display device.

When the display device is a mobile type, it is possible to calculate the position and orientation of the display device using a method similar to the processing for calculating the position and orientation of the imaging apparatus described in the above-described second exemplary embodiment and dispose, based on the calculated position and orientation, a 3-dimensional virtual object on the 3-dimensional position of the display device. In this case, a display device position and orientation calculating section is added to the arrangement shown in FIG. 5.

The above-described exemplary embodiment can be applied to a system using a video see-through head mounted display that can present a mixed reality to a user who wears the head mounted display. In this case, for example, an image capturing section of the head mounted display can function as the imaging apparatus 130 of the above-described exemplary embodiments. The position and orientation of the head mounted display can be obtained based on indices. A virtual image can be generated with reference to the obtained position and orientation. The image capturing section can combine the virtual image with a captured image to present a user a mixed reality.

Furthermore, the display device 180 can display an image identical to the image displayed on the head mounted display, so that other observers can simultaneously experience the mixed reality together with the user.

Each of the above-described exemplary embodiments can prevent an information processing system from erroneously detecting a displayed index image as a real index, and accordingly can provide an accurate and reliable mixed reality.

Furthermore, to accomplish the purpose of the present invention, software program code for realizing the functions of the above-described exemplary embodiments can be supplied, via a storage medium (or a recording medium), to a system or an apparatus. A computer (or CPU or MPU) in the system or the apparatus can read the program code stored in the storage medium and can execute the readout programs.

In this case, the program code read out from the storage medium can realize the functions of the exemplary embodiments. The equivalents of programs can be used if they possess comparable functions. Accordingly, when the functions or processes of the present invention are realized by a computer, program code installed in the computer and a recording medium storing the programs function as a unit for realizing the present invention.

In other words, the present invention encompasses the computer programs that can realize the functions or processes of the present invention or any recording medium that can store the programs. In this case, the type of programs can be selected from any one of object codes, interpreter programs, and OS script data.

A recording medium supplying the programs can be selected from any one of flexible disk, hard disk, optical disk, magneto-optical disk, MO, CD-ROM, CD-R, CD-RW, magnetic tape, nonvolatile memory card, ROM, and DVD (DVD-ROM, DVD-R).

The method for supplying the programs includes accessing a home page on the Internet using the browsing function of a client computer, when the home page allows each user to download the computer programs of the present invention, or compressed files of the programs having automatic installing functions, to a hard disk or other recording medium of the user.

Furthermore, the program codes constituting the programs of the present invention can be divided into a plurality of files so that respective files are downloadable from different home pages. Namely, the present invention encompasses WWW servers that allow numerous users to download the program files so that the functions or processes of the present invention can be realized on their computers.

Furthermore, enciphering the programs of the present invention and storing the enciphered programs in a CD-ROM or comparable recording medium is a practical method when the programs of the present invention are distributed to the users. The authorized users (i.e., users satisfying predetermined conditions) are allowed to download key information from a home page on the Internet. The users can decipher the programs with the obtained key information and can install the programs on their computers. When the computer reads and executes the installed programs, the functions of the above-described exemplary embodiments can be realized.

Furthermore, not only the functions of the above-described exemplary embodiments can be realized by a computer that executes the programs, but also an operating system (OS) running on the computer can execute part or all of the actual processing based on instructions of the programs.

Furthermore, the program code read out of a storage medium can be written into a memory of a feature expansion board equipped in a computer or into a memory of a feature expansion unit connected to the computer. In this case, based on an instruction of the program, a CPU provided on the feature expansion board or the feature expansion unit can execute part or all of the processing so that the functions of the above-described exemplary embodiments can be realized.

When the present invention is applied to the above-described recording medium, the program code corresponding to the above-described flowcharts can be stored in the recording medium.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

What is claimed is:

1. An information processing apparatus comprising:
    an image input unit adapted to obtain an input image of a physical space that was captured by an image capturing unit, wherein the input image includes an index to be used in processing for obtaining a position and orientation of the image capturing unit, located in the physical space, and the input image can include a display device, located in the physical space, for displaying an image generated based on the input image;
    a detection unit adapted to detect the index included in the input image;
    a position and orientation measuring unit adapted to obtain a position and orientation of the image capturing unit based on the index detected by the detection unit;
    a generation unit adapted to generate a display image to be displayed on the display device by changing the index in the input image based on a specific image so that an index displayed on the display device is not used in the processing for obtaining the position and orientation of the image capturing unit by the position and orientation measuring unit in a case where the index displayed on the display device is included in an input image; and
    an output unit adapted to cause the display device to display the display image generated by the generation unit,
    wherein if the index that is changed based on the specific image is displayed on the display device and is included in the input image, the position and orientation measuring unit obtains the position and orientation of the image capturing unit without using the index that is changed based on the specific image.

2. The information processing apparatus according to claim 1, wherein the generation unit changes the index by replacing a part of a region of the index with the specific image.

3. The information processing apparatus according to claim 1, wherein a shape of the index is square.

4. An information processing method comprising:
    obtaining an input image of a physical space that was captured by an image capturing unit, wherein the input image includes an index to be used in processing for obtaining a position and orientation of the image capturing unit, located in the physical space, and the input image can include a display device, located in the physical space, for displaying an image generated based on the input image;
    detecting the index included in the input image;
    obtaining a position and orientation of the image capturing unit based on the index;
    generating a display image to be displayed on the display device by changing the index in the input image based on a specific image so that an index displayed on the display device is not used in the processing for obtaining the position and orientation of the image capturing unit in a case where the index displayed on the display device is included in an input image; and
    causing the display device to display the generated display image,
    where in if the index that is changed based on the specific image is displayed on the display device and is included in the input image, the position and orientation are obtained without using the index that is changed based on the specific image.

5. The apparatus according to claim 1, wherein the image capturing unit is attached to a head mounted display.

6. The apparatus according to claim 5, further comprising:
    a second generation unit configured to generate a virtual image based on the position and orientation and to generate a synthesized image generated by synthesizing the input image with the generated virtual image, and
    a second output unit adapted to cause the head mounted display to display the synthesized image generated by the second generation unit, the head mounted display being separate from the display device.

7. A non-transitory computer-readable medium storing a program for causing a computer to function as:
    an image input unit adapted to obtain an input image of a physical space that was captured by an image capturing unit, wherein the input image includes an index to be used in processing for obtaining a position and orientation of the image capturing unit, located in the physical space, and the input image can include a display device, located in the physical space, for displaying an image generated based on the input image;
    a detection unit adapted to detect the index included in the input image;
    a position and orientation measuring unit adapted to obtain a position and orientation of the image capturing unit based on the index detected by the detection unit;
    a generation unit adapted to generate a display image to be displayed on the display device by changing the index in the input image based on a specific image so that an index displayed on the display device is not used in the processing for obtaining the position and orientation of the image capturing unit by the position and orientation measuring unit in a case where the index displayed on the display device is included in an input image; and
    an output unit adapted to cause the display device to display the display image generated by the generation unit,
    wherein if the index that is changed based on the specific image is displayed on the display device and is included in the input image, the position and orientation measuring unit obtains the position and orientation of the image capturing unit without using the index that is changed based on the specific image.

8. An information processing apparatus comprising:

an image input unit adapted to obtain an input image of a physical space that was captured by an image capturing unit, wherein the input image includes an index to be used in a processing for obtaining a position and orientation of the image capturing unit, located in the physical space and the input image can include a display device for displaying an image generated based on the input image, located in the physical space;

a detection unit adapted to detect the index included in the input image;

a position and orientation measuring unit adapted to obtain a position and orientation of the image capturing unit based on the index detected by the detection unit;

a generation unit adapted to generate a display image to be displayed on the display device by synthesizing a specific image for invalidating a detected index with the index in the input image; and an output unit adapted to cause the display device to display the display image generated by the generation unit, where in if the index with which the specific image is synthesized, displayed on the display device is included in an input image, the position and orientation measuring unit obtains a position and orientation of the image capturing unit without using the index with which the specific image is synthesized.

9. The apparatus according to claim 8, wherein the generation unit synthesizes the specific image with the index in the input image by overlaying the specific image on a region of the index in the input image.

10. The apparatus according to claim 8, wherein the specific image for invalidating a detected index is synthesized with a region of the index in the input image, the region being for determining a direction of the index.

11. The apparatus according to claim 8, wherein the specific image invalidates the index by making it impossible for the position and orientation measuring unit to determine a direction of the index.

12. The apparatus according to claim 8, wherein the image capturing unit is attached to a head mounted display.

* * * * *